Nov. 17, 1936.     C. H. SMITH     2,061,523
SULPHUR
Filed Dec. 9, 1933
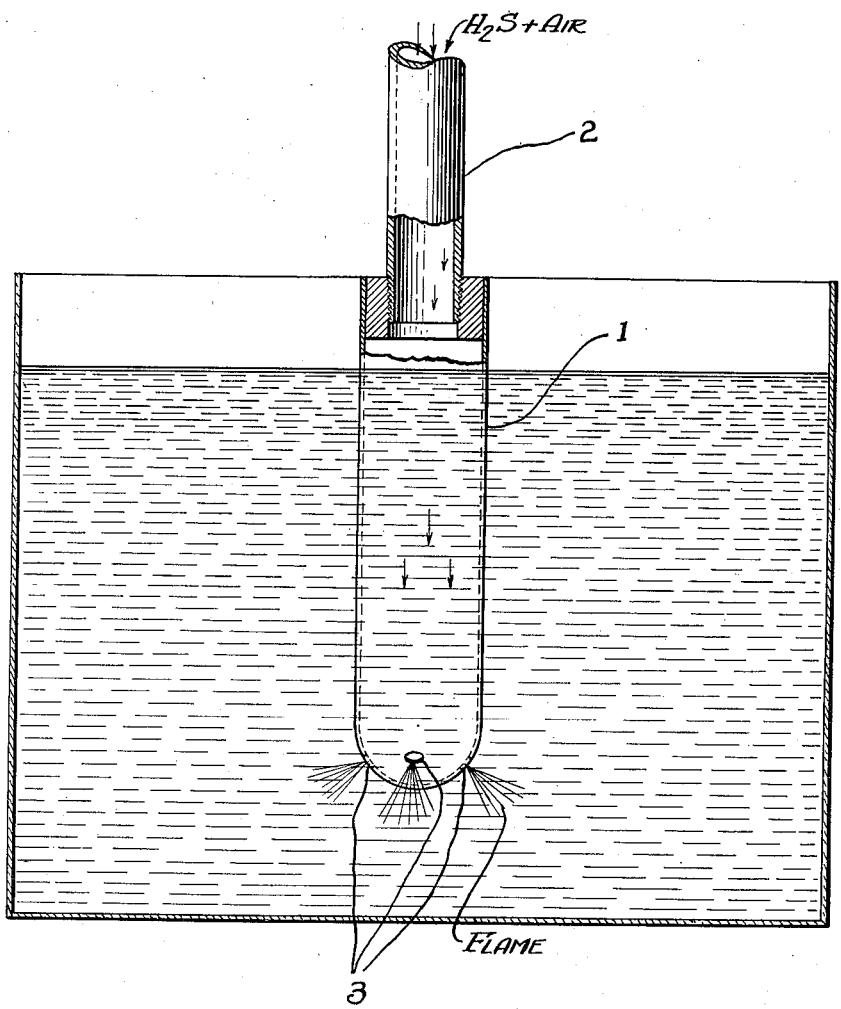
Inventor
Claude H. Smith Patented Nov. 17, 1936

2,061,523

UNITED STATES PATENT OFFICE 2,061,523

SULPHUR

Claude H. Smith, Tallmadge, Ohio, assignor to Wingfoot Corporation, Wilmington, Del., a corporation of Delaware Application December 9, 1933, Serial No. 701,596

4 Claims. (Cl. 23—226)

This invention relates to the production of sulphur. More particularly it relates to the production of sulphur by regulated combustion of hydrogen sulphide and includes burning the hydrogen sulphide in the absence of excess oxygen and cooling the sulphur produced as it is formed so as to obtain a sulphur product which is largely insoluble.

Sulphur occurs in various forms. Even in a commercial product such as flowers of sulphur the sulphur is present in more than one form as is evidenced by the face that a part of the sulphur is soluble in organic solvents such as carbon disulphide and benzene, and another portion is relatively insoluble in such solvents. By the expression "insoluble sulphur" is meant sulphur which is relatively insoluble in benzol. Such insoluble sulphur has been found to have particular value for certain purposes as in the rubber industry. Ordinary commercial flowers of sulphur contains about 30 to 32% of insoluble sulphur. The soluble sulphur may be extracted from flowers of sulphur to obtain the valuable insoluble sulphur. However the yield of insoluble sulphur from such a process is small and the cost is relatively high.

It has now been found that sulphur, which is to a large extent insoluble, is formed if hydrogen sulphide is burned under such conditions that sulphur is produced and the sulphur thus obtained is immediately cooled. According to the preferred form of this invention the combustion of the hydrogen sulphide takes place under water and the water is maintained at a low temperature so that the sulphur is cooled as it is formed. Sulphur thus obtained has been found to have a high content of insoluble sulphur. It may contain as much as 50% or over and as high as 60 to 70% or more of insoluble sulphur, depending upon how efficiently the sulphur is cooled as it is formed, and possibly also other factors.

Altho the most satisfactory results have been obtained by burning the hydrogen sulphide under water, maintaining the temperature of the water under 40° F., other cooling fluids may be employed. The combustion may, for example, take place under the surface of a salt solution which is cooled even to a temperature below the freezing point of water or the combustion may take place in a suitably cooled inert atmosphere such as carbon dioxide. For example, the flame in an inert atmosphere may be made to impinge on a rotating metal plate, suitably cooled. The deposited sulphur may be scraped from the plate as it rotates. Some oxygen may be present in the atmosphere but it is necessary that the atmosphere be inert to the extent that the sulphur is not burnt to sulphur dioxide.

When hydrogen sulphide is burned in oxygen sulphur dioxide is formed. By limiting the amount of oxygen employed for combustion so that only one-third of the hydrogen sulphide is burned to sulphur dioxide, the remainder of the hydrogen sulphide will combine with the sulphur dioxide to produce sulphur and water. Therefore, in the preferred form of this invention hydrogen sulphide is burned with one-third of a volume of oxygen and substantially all of the sulphur in the hydrogen sulphide is converted to elemental sulphur. Other oxidizing gases than oxygen may be employed for the combustion and fuel gases such as natural gas, etc. may be employed in carrying out the reaction to control the temperature of the flame. However, ordinary air will be the most convenient and most suitable oxidizing medium and in the preferred form of the invention it will be used in such amount as to convert one-third of the hydrogen sulphide to sulphur dioxide so that the maximum yield of sulphur will be obtained.

The operation may conveniently be carried out by passing the air and hydrogen sulphide thru separate metering devices to insure the proper proportioning of the air and hydrogen sulphide and then thru a carbureter to provide adequate mixing. The mixed gases may then be passed thru any suitable nozzle and burned. The nozzle is advantageously swiveled from a stationary joint in such a way that it may be brought to a horizontal position and the gases ignited and then swung down underneath the surface of the cooling bath which may be water cooled, for example, below 40° F. The insoluble sulphur in the sulphur formed, may be recovered by any suitable extraction means. The nitrogen in the air used for combustion bubbles up from the flame through the cooling bath.

A suitable nozzle is shown in the accompanying drawing where 1 indicates the nozzle, 2 indicates the pipe for introducing the mixture of gases into the nozzle and the openings at which combustion takes place are indicated by 3. The vessel contains water which may be cooled by ice or suitable coils.

Other types of burners may be used and in some cases an electric spark may be employed to insure continuous combustion. In the type of nozzle indicated in the drawing a spark is not necessary if the gases are maintained under sufficient pressure to supply the amount of gas required for combustion. The supply pipe is advantageously equipped with a safety valve and a fire check.

By burning hydrogen sulphide with one-third of its volume of oxygen in the form of air, in water cooled below about 40° F., sulphur which had an insoluble content of around 67% was obtained in the form of a finely divided solid. The insoluble content will vary with the temperature of the water. Various means may be employed for excluding excess air from the burner and cooling the sulphur as it is formed.

I claim:

1. The method of producing sulphur which comprises burning a mixture of hydrogen sulphide and a limited amount of oxygen diluted with an inert gas under water so as to produce sulphur and maintaining the water at a temperature below about 40° F.

2. The method of producing sulphur which comprises burning three volumes of hydrogen sulphide with about one volume of oxygen under water while cooling the water to below about 40° F.

3. The method of producing sulphur of high insoluble sulphur content which comprises burning hydrogen sulphide with a limited amount of air under water so as to surround small volumes of the resulting sulphur vapor and inert gas with the water, thereby rapidly cooling the sulphur and causing it to separate in the form of a finely divided solid.

4. The method of producing sulphur of high insoluble sulphur content which comprises burning hydrogen sulphide with a limited amount of air under water so as to surround small volumes of the resulting sulphur vapor and inert gas with the water and maintaining the water at a temperature below about 40° F. thereby rapidly cooling the sulphur and causing it to separate in the form of a finely divided solid.

CLAUDE H. SMITH.